United States Patent
Wu

(10) Patent No.: US 8,386,548 B2
(45) Date of Patent: Feb. 26, 2013

(54) AUDIO DATA PROCESSING DEVICE AND METHOD

(75) Inventor: Chun-Te Wu, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 451 days.

(21) Appl. No.: 12/844,844

(22) Filed: Jul. 28, 2010

(65) Prior Publication Data

US 2011/0145309 A1 Jun. 16, 2011

(30) Foreign Application Priority Data

Dec. 11, 2009 (CN) .......................... 2009 1 0311269

(51) Int. Cl.
*G06F 7/38* (2006.01)

(52) U.S. Cl. ....................................................... 708/290

(58) Field of Classification Search ........................ None
See application file for complete search history.

(56) References Cited

U.S. PATENT DOCUMENTS

| | | | |
|---|---|---|---|
| 6,795,740 B1 | 9/2004 | Chu et al. | |
| 7,957,455 B2 * | 6/2011 | Paul et al. | 375/148 |
| 2007/0185909 A1 * | 8/2007 | Klein et al. | 707/104.1 |
| 2009/0248768 A1 * | 10/2009 | Fukumoto et al. | 708/207 |
| 2011/0145309 A1 * | 6/2011 | Wu | 708/290 |

* cited by examiner

*Primary Examiner* — David H Malzahn
(74) *Attorney, Agent, or Firm* — Altis Law Group, Inc.

(57) ABSTRACT

An audio data processing device and method includes selecting one multiple-S-curves, and running an interpolation arithmetic upon original points according to the selected multiple-S-curve. Selecting one multiple-S-curve includes selecting one of a plurality of S-curves corresponding to a current utilization ratio of a processor, obtaining audio data having a fixed length including sampling frequencies and the original points of the obtained audio data, and selecting the one multiple-S-curves corresponding to the selected S-curve and the obtained sampling frequencies.

10 Claims, 6 Drawing Sheets

(A)

(B)

(C)

AUDIO DATA PROCESSING DEVICE AND METHOD

BACKGROUND

1. Technical Field

Embodiments of the present disclosure relate to audio data processes, and particularly to an audio data processing device and an audio data processing method.

2. Description of Related Art

Lossy compression is a data compression method which loses some of the data, in order to achieve high compression rate. The lossy compression is most commonly used to compress multimedia data (such as audio, video, still images), especially in applications such as streaming media and internet telephony.

However, in the lossy compression of the audio data, the high frequency sections of the audio data will be lost, which leads to the audio data sound lower, and timbre of the audio data to decline. Thus, an unaddressed need correspondingly exists in the data processing device and method to improve the timbre of the audio data.

DETAILED DESCRIPTION

Figure 1:
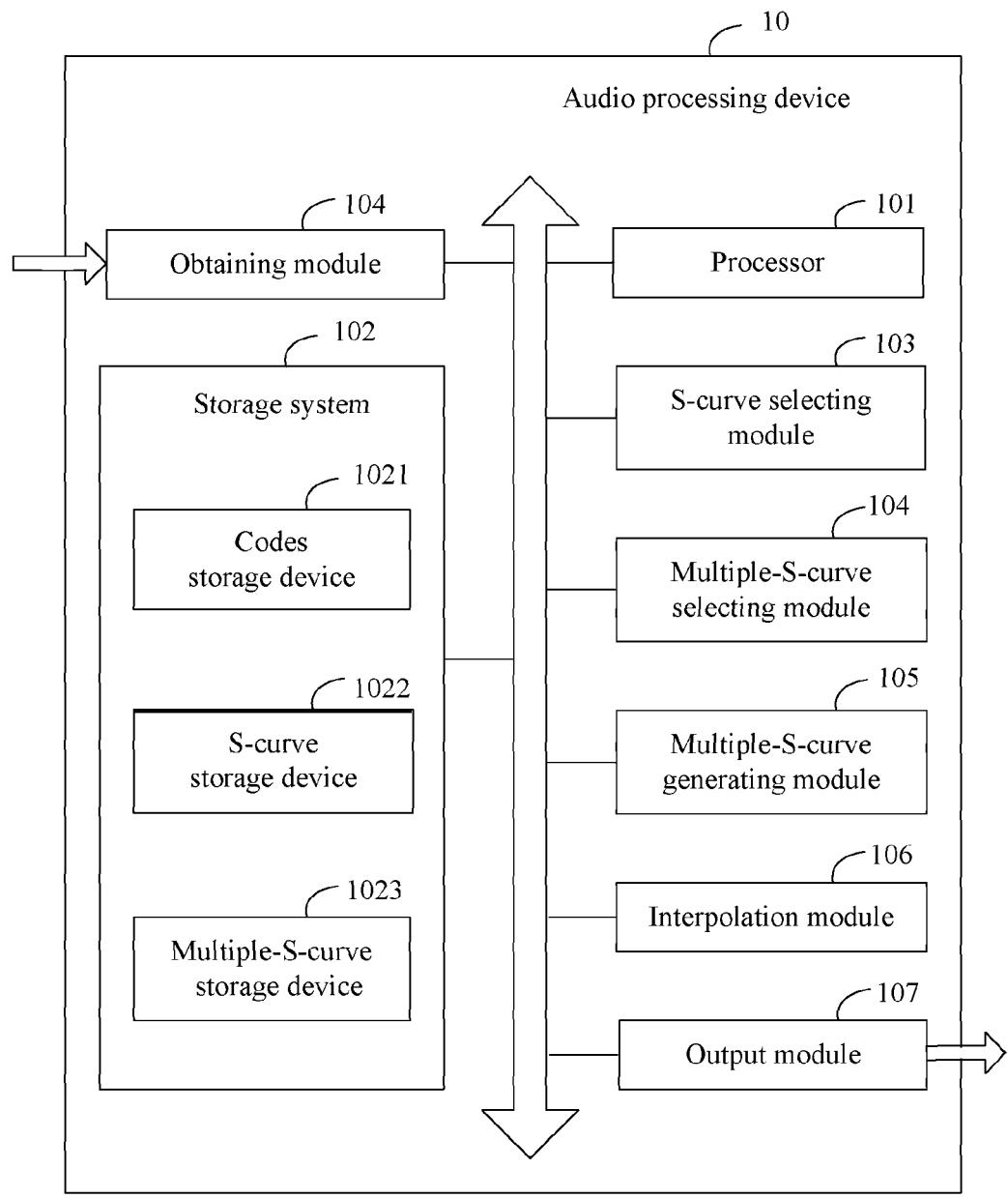
FIG. 1 is a block diagram of one exemplary embodiment of an audio data processing device of the present disclosure.

Referring to FIG. 1, one exemplary embodiment of an audio data processing device 10 is shown. The audio data processing device 10 runs an interpolation arithmetic for obtained audio data, to improve timbre damaged by lossy compression.

The audio data processing device 10 comprises a processor 101, a storage system 102, and one or more functional modules. The storage system 102 comprises a plurality of storage device, such as a codes storage device 1021, an S-curve storage device 1022, and a multiple-S-curve storage device 1023. The plurality of storage devices may be hard disk drives, flash memories, for example.

The one of more functional modules are stored in the codes storage device 1021, and executed by the processor 101. In one embodiment, the one or more functional modules comprise an S-curve selecting module 103, an obtaining module 104, a multiple-S-curve selecting module 104, a multiple-S-curve generating module 105, an interpolation module 106, and an output module 107.

Figure 2:
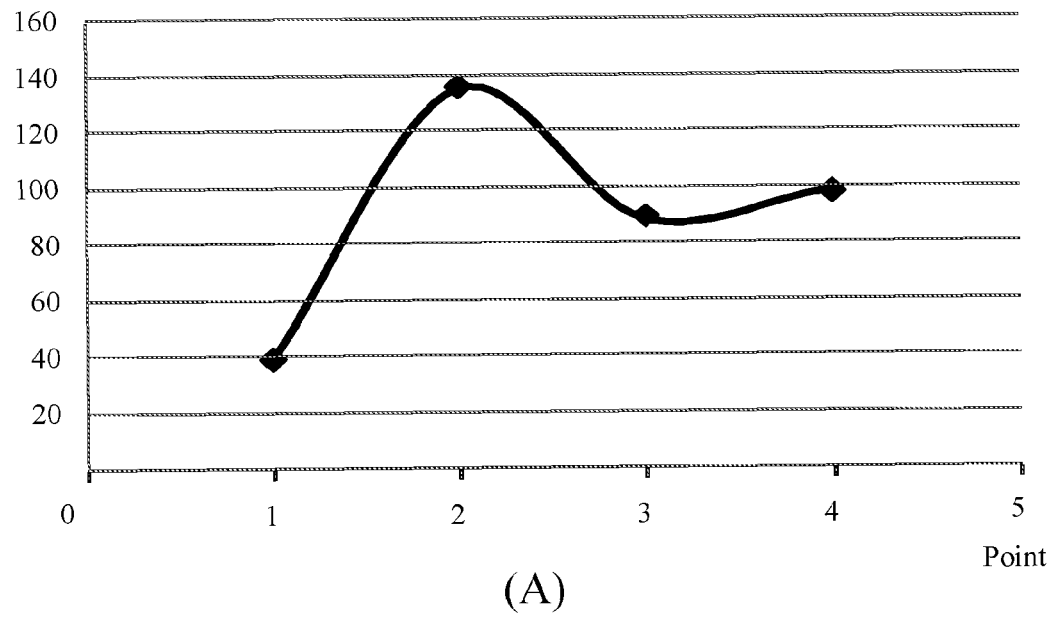
FIG. 2 is a schematic diagram of exemplary embodiments of an S-curve of the present disclosure.
Figure 2:
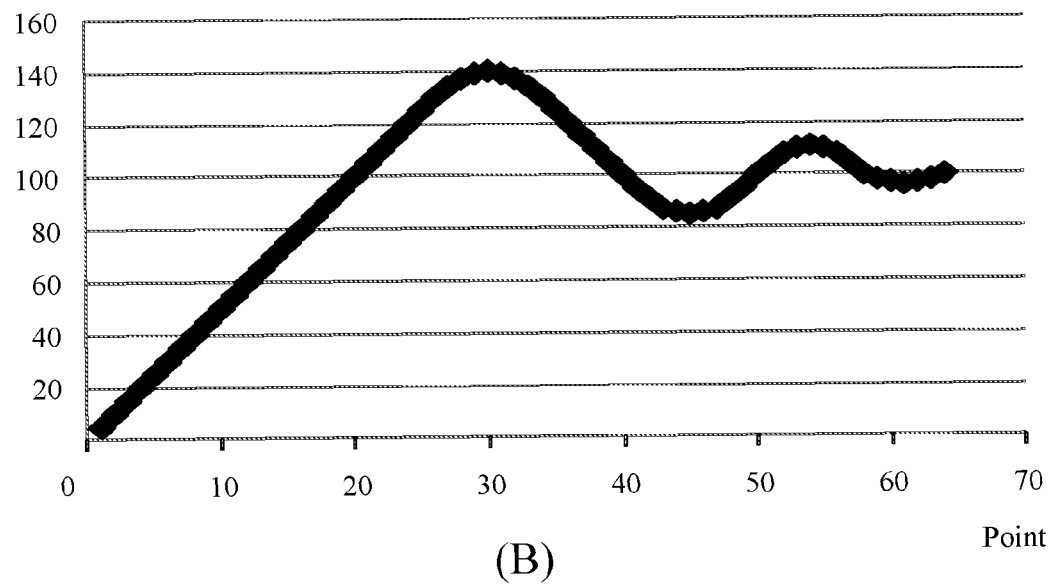

The S-curve storage device 1022 stores a plurality of S-curves. In one embodiment, each S-curve is formed by a number of points arranged on frequencies movement of the obtained audio data, such as 64 points, 32 points, 16 points, 8 points, and 4 points S-curve. Referring to FIG. 2, a schematic diagram of exemplary embodiments of the S-curve is shown. In detail, FIG. 2(A) is a schematic diagram of 4 points S-curve. FIG. 2(B) is a schematic diagram of 64 points S-curve. An x-axis describes points of the obtained audio data, and a y-axis describes percents of the frequency movement between the points. It is seen that the more points, the more clear the frequency movement shows. Furthermore, number of the points of each S-curve is corresponding to the utilization ratio of the processor 101, to use the processor 101 efficiently.

The S-curve selecting module 103 selects one of the plurality of S-curves in the S-curve storage device 1022 corresponding to a current utilization ratio of the processor 101. In one embodiment, the higher the utilization ratio of the processor 101 is, the lower the number of point of the S-curve is selected. For example, the 64 points S-curve is selected corresponding to utilization ratio 1-20%, and the 4 points S-curve is selected corresponding to utilization ratio 80-100%.

The obtaining module 104 continually obtains audio data having a fixed length. In one embodiment, the obtained audio data comprises sampling frequencies and original points of the obtained audio data.

The sampling frequencies are frequency sections sampling in a second. The higher the frequency sections are, the more natural the audio data reproduces. The common sampling frequencies comprise 11.025 KHz, 22.05 KHz and 44.1 KHz. 44.1 KHz sounds as CD timbre, so most of the time 44.1 KHz can be considered as a standard sampling frequency. As the audio data with the fixed length shown in FIG. 3(B), the sampling frequencies are 11.025 KHz, and the original points are 4 in the fixed length.

Figure 4:
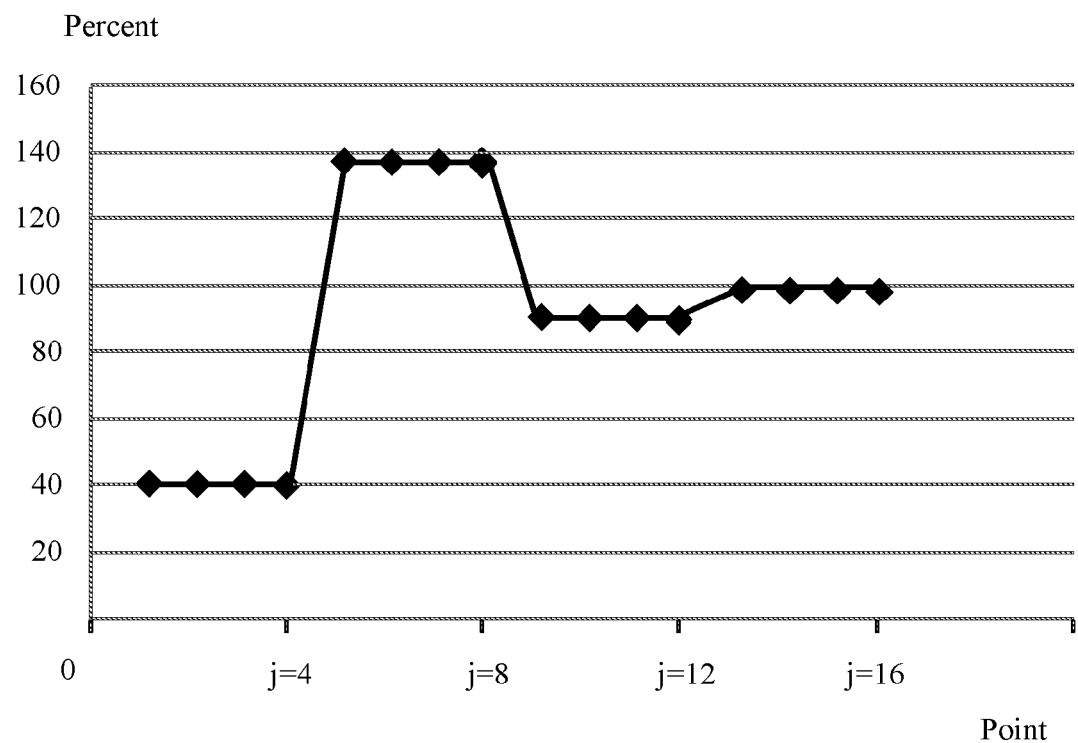
FIG. 4 is a schematic diagram of one exemplary embodiment of a multiple-S-curve of the present disclosure.

The multiple-S-curve storage device 1023 stores a plurality of multiple-S-curve. In one embodiment, the term of multiple-S-curve means to replicate the points of the S-curve. FIG. 4 is one exemplary embodiment of multiple-4 points S-curve.

The multiple-S-curve selecting module 104 determines whether one of the plurality of multiple-S-curves is corresponding to the obtained sampling frequencies and the selected S-curve.

The multiple-S-curve generating module 105 generates a new multiple-S-curve, when no multiple-S-curve in the multiple-selecting module is corresponding to the selected S-curve and the obtained sampling frequencies. In one embodiment, the multiple-S-curve generating module 105 first calculates a ratio of the standard sampling frequency to the obtained sampling frequency. Referring to the audio data with the fixed length shown in FIG. 3(B), the obtained sampling frequency may be 11.025 KHz, if the standard sampling frequency is predefined to be 44.1 KHz, then it is need to extend 1 original point to be 4 points. The multiple-S-curve generating module 105 generates a new multiple-S-curve corresponding to the ratio of the standard sampling frequency to the obtained sampling frequency and the selected S-curve, as shown in FIG. 4.

The interpolation module 106 runs the interpolation arithmetic upon the original points of the obtained audio data. In one embodiment, the interpolation module 106 runs the interpolation arithmetic, shown as the multiple-S-curve in FIG. 4, for the original points shown in FIG. 3(B), to generate interpolated audio data, as shown in FIG. 3(C).

Figure 3:
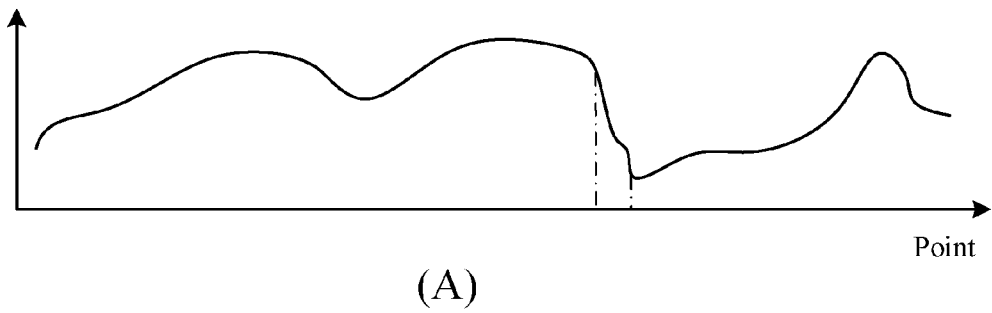
FIG. 3 is a schematic diagram of exemplary embodiments of audio data of the present disclosure.
Figure 3:
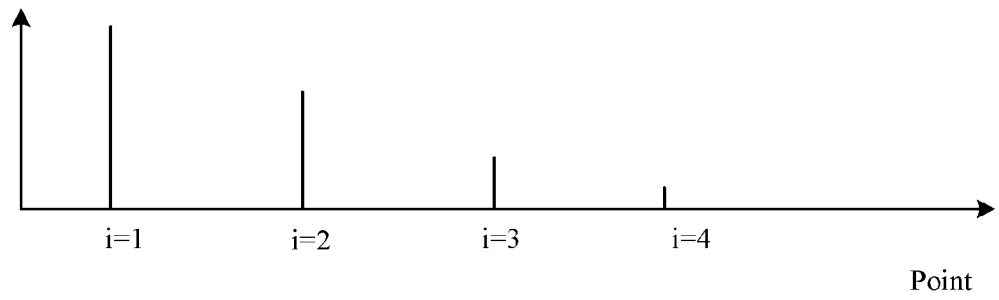
Figure 3:
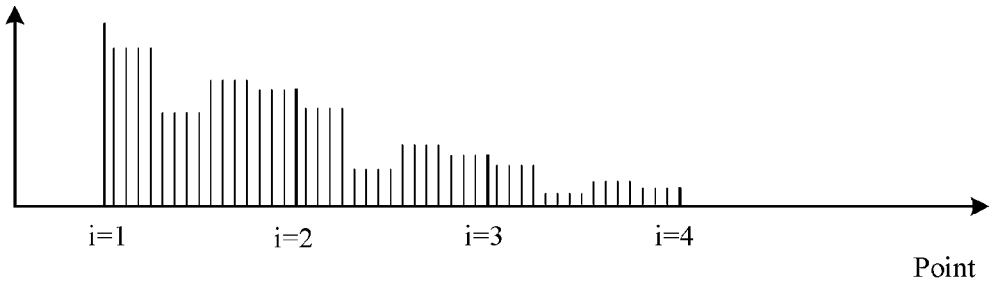

As shown in FIG. 3(C), the point number to be interpolated between point i and point i+1 is 16−1=15. In one embodiment, the frequency interpolated equals (frequency of point i+1 minus frequency of point i) multiplied by a percent of point j of the selected multiple-S-curve.

The output module 107 outputs the interpolated audio data.

In one embodiment, the audio data processing device 10 interpolates the high frequency parts into the obtained audio data by running the interpolation arithmetic, to improve the timbre of the obtained audio data.

Figure 5:
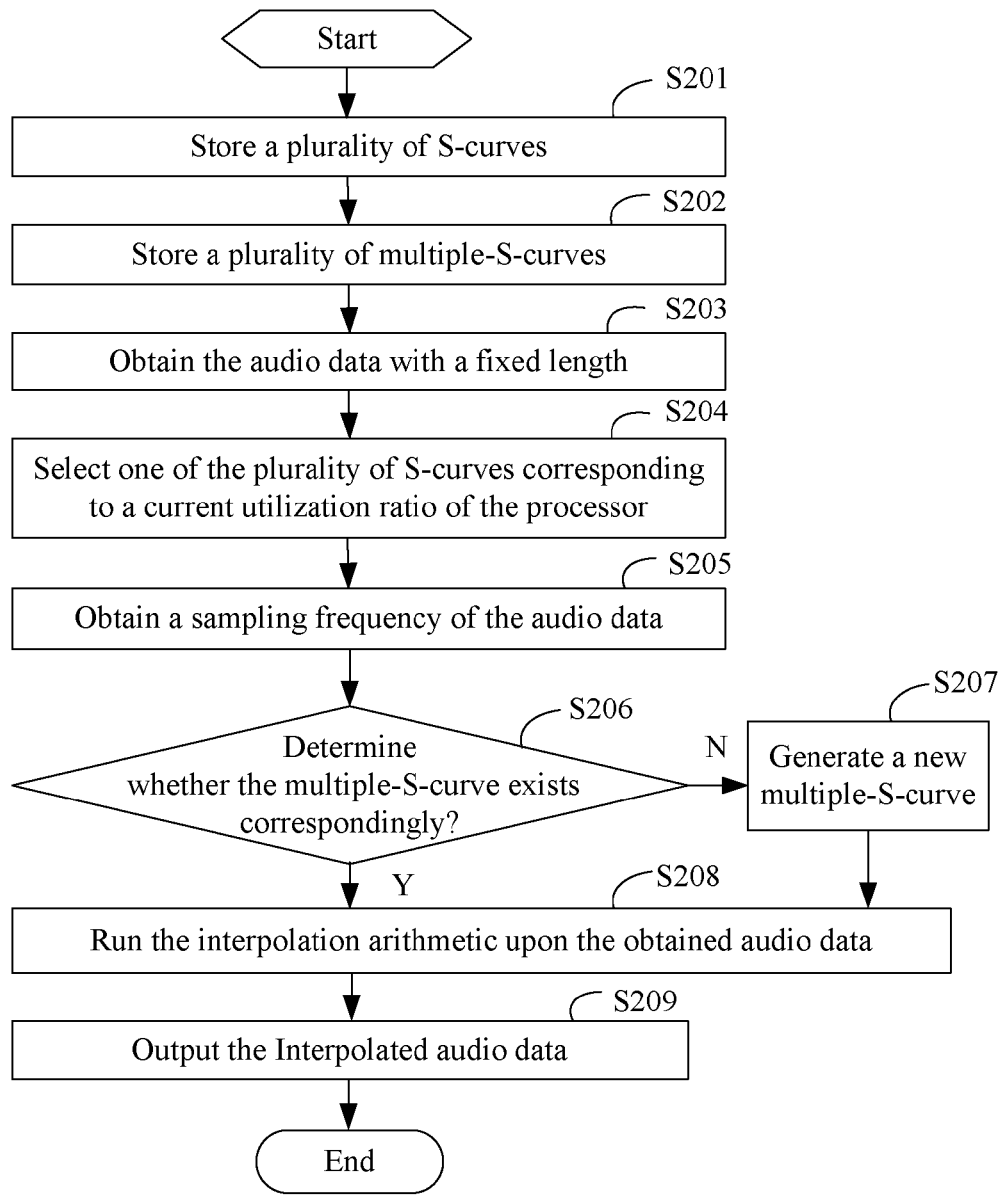
FIG. 5 is a flowchart of one exemplary embodiment of an audio data processing method of the present disclosure.

Referring to FIG. 5, one exemplary embodiment of an audio data processing method is shown. In one embodiment, the audio data processing method may be applied in the audio data processing device 10 as shown in FIG. 1. The audio data processing method runs an interpolation arithmetic for the obtained audio data, to improve timbre of the audio data damaged by the lossy compression. Depending on the embodiment, additional blocks may be added, others deleted, and the ordering of the blocks may be changed.

In block S201, an S-curve storage device 1022 stores a plurality of S-curves corresponding to different utilization ratios of a processor 101. In one embodiment, each S-curve is formed by a number of points arranged on frequencies movement of the obtained audio data, such as 64 points and 4 points S-curve shown in FIG. 2. Number of the points of each S-curve is corresponding to the utilization ratio of the processor 101. In one embodiment, the higher utilization ratio of the processor 101 is, the lower the number of the points of the corresponding S-curve is, to use the processor 101 efficiently.

In block S202, a multiple-S-curve storage device 1023 stores a plurality of multiple-S-curves. In one embodiment, the term of multiple-S-curve means to replicate the points of the S-curve. As shown in FIG. 4, the multiple-S-curve is one exemplary embodiment of multiple-4 points S-curve.

In block S203, an obtaining module 104 obtains audio data having a fixed length. In one embodiment, the obtained audio data comprises sampling frequencies and original points of the obtained audio data. In one embodiment, the sampling frequencies are frequency sections sampling in a second. The common sampling frequencies comprise 11.025 KHz, 22.05 KHz and 44.1 KHz. As the audio data with the fixed length shown in FIG. 3(B), the obtained sampling frequencies are 11.025 KHz, and the original points are 4 in the fixed length.

In block S204, the S-curve selecting module 103 selects one of the plurality of S-curves from the S-curve storage device 1022 corresponding to a utilization ratio of the processor 101. In one embodiment, the S-curve may be selected flexibly. When the utilization ratio of the processor 101 is higher, it can be recommended to select the S-curve with lower the number of points, to lighten the burden of the processor 101. For example, when the utilization ratio of the processor 101 is 87%, a 4 points S-curve may be selected, as shown in FIG. 2(A).

In block S205, the multiple-S-curve selecting module 104 obtains a obtained sampling frequencies from the obtaining module 104. Referring to FIG. 3(B), the obtained sampling frequency is 11.025 KHz.

In block S206, the multiple-S-curve selecting module 104 determines whether one of the plurality of the multiple-S-curves is corresponding to the obtained sampling frequencies and the current S-curve. In one embodiment, if the multiple-S-curve selecting module 104 determines no one is corresponding, the flow goes to S207. If the multiple-S-curve selecting module 104 determines one is corresponding, the flow goes to S208.

In block S207, the multiple-S-curve generating module 105 generates a new multiple-S-curve corresponding to the selected S-curve and the obtained sampling frequencies. In one embodiment, the multiple-S-curve generating module 105 first calculates a ratio of the standard sampling frequency to the obtained sampling frequency. Referring to the audio data with the fixed length shown in FIG. 3(B), the obtained sampling frequency may be 11.025 KHz, if the standard sampling frequency is predefined to be 44.1 KHz, then it needs to extend 1 original point to be 4 points. The multiple-S-curve generating module 105 generates a new multiple-S-curve, as shown in FIG. 4 corresponding to the ratio of the standard sampling frequency to the obtained sampling frequency and the selected S-curve.

Referring to a section of the obtained audio data shown in FIG. 3(B), the obtained sampling frequency may be 11.025 KHz. If the standard sampling frequency is predefined to be 44.1 KHz, it needs to extend 1 original point to be 4 points in the fixed length. That is, The multiple-S-curve generating module 105 generates the multiple-S-curve as shown in FIG. 4.

In block S208, the interpolation module 106 runs the interpolation arithmetic upon the original points of the obtained audio data. In one embodiment, the interpolation module runs the interpolation arithmetic, shown as the multiple-S-curve in FIG. 4, upon the original points shown in FIG. 3(B), to generate interpolated audio data, as shown in FIG. 3(C).

As shown in FIG. 3(C), the points to be interpolated between the point i and the point i+1 is 16−1=15, referring to FIG. 4. In one embodiment, the frequency interpolated equals (frequency of point i+1 minus frequency of point i) multiplied by a percent of point j of the selected multiple-S-curve.

In block S209, the output module 107 outputs the interpolated audio data. In one embodiment, the interpolated audio data is output for further decoding.

Figure 6:
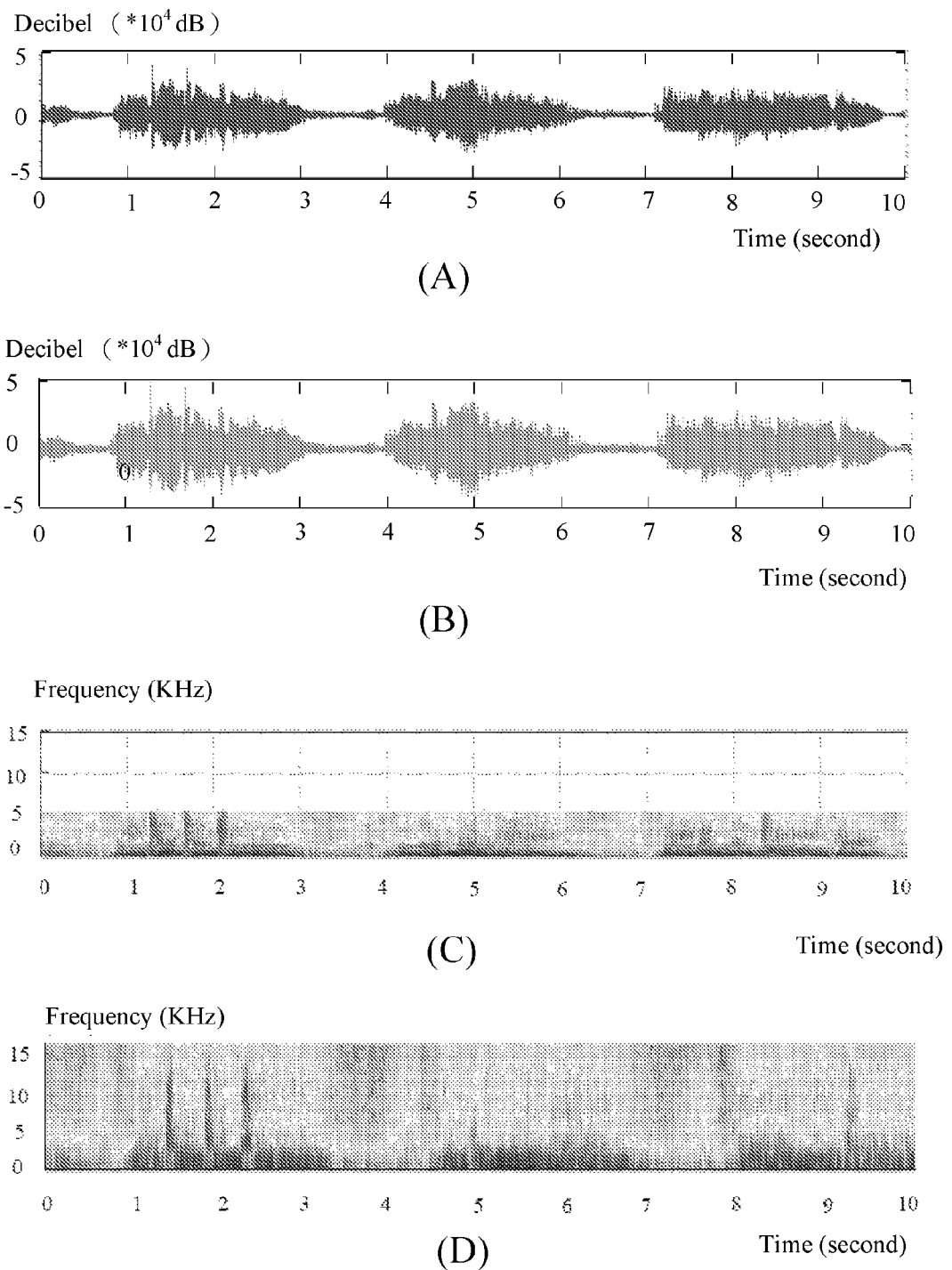
FIG. 6 is a schematic diagram of exemplary embodiment of effect comparisons between obtained audio data and interpolated audio data of the present disclosure.

FIG. 6 is a schematic diagram of exemplary embodiment of effect comparisons between the obtained audio data and the interpolated audio data, respectively shown in FIG. 3(B) and FIG. 3(C). As shown in FIG. 6(A) and FIG. 6(B), changes of the decibels between FIG. 6(A) and FIG. 6(B) is inconspicuous. As shown in FIG. 6(C), the frequencies of the obtained audio data, analysis by short time fourier transform (STFT), is between 0-5 KHz. As shown in FIG. 6(D), the frequencies of the interpolated audio data, is between 0-15 KHz. That is, the frequencies beyond 5 KHz is interpolated by the audio data processing device and the audio data processing method, and the timbre sounds more natural.

The description of the present disclosure has been presented for purposes of illustration and description, and is not intended to be exhaustive or limited to the disclosure in the form disclosed. Many modifications and variations will be apparent to those of ordinary skill in the art. Various embodiments were chosen and described in order to best explain the principles of the disclosure, the practical application, and to enable others of ordinary skill in the art to understand the disclosure for various embodiments with various modifications as are suited to the particular use contemplated.

What is claimed is:

1. An audio data processing device, comprising:
   a processor;
   an S-curve storage device to store a plurality of S-curves corresponding to different utilization ratios of the processor;
   a multiple-S-curve storage device to store a plurality of multiple-S-curves, a codes storage device, and one or more programs stored in the codes storage device, and executed by the processor, wherein the one or more programs comprise:
      an S-curve selecting module to select one of the plurality of S-curves corresponding to a current utilization ratio of the processor from the S-curve storage device;
      an obtaining module to obtain audio data having a fixed length, wherein the obtained audio data comprise sampling frequencies and original points of the obtained audio data;

a multiple-S-curve selecting module to select one of the plurality of multiple-S-curves from the multiple-S-curve storage device corresponding to the selected S-curve and the sampling frequencies;

an interpolation module to run an interpolation arithmetic upon the original points according to the selected multiple-S-curve; and an output module to output the interpolated audio data that interpolated by the interpolation module.

2. The audio data processing device as claimed in claim 1, wherein each S-curve is formed by a number of points arranged on frequencies movement of the obtained audio data.

3. The audio data processing device as claimed in claim 2, wherein number of the points of each S-curve is corresponding to the utilization ratio of the processor.

4. The audio data processing device as claimed in claim 3, wherein the higher the utilization ratio of the processor is, the lower the number of the points of the corresponding S-curve is.

5. The audio data processing device as claimed in claim 1, further comprising a multiple-S-curve generating module to generate a new multiple-S-curve corresponding to the selected S-curve and the sampling frequencies when the multiple-S-curve selecting module selects no corresponding multiple-S-curve in the multiple-S-curve storage device.

6. An audio data processing method, applied in an audio data processing device with a processor and a storage system, the audio data processing method comprising:

storing a plurality of S-curves in the storage system, wherein the S-curves correspond to different utilization ratios of the processor;

storing a plurality of multiple-S-curve in the storage system;

obtaining audio data having a fixed length, wherein the obtained audio data comprises sampling frequencies and original points of the obtained audio data;

determining a current utilization ratio of the processor, and selecting one of the plurality of S-curves corresponding to the current utilization ratio of the processor;

selecting one of the plurality of multiple-S-curves corresponding to the selected S-curve and the sampling frequencies;

running an interpolation arithmetic upon the original points as the selected multiple-S-curve; and outputting the interpolated audio data.

7. The audio data processing method as claimed in claim 6, wherein the step of selecting one of the plurality of multiple-S-curve comprises:

determining whether one of the plurality of multiple-S-curves is corresponding to the selected S-curve and the sampling frequencies;

if one of the plurality of multiple-S-curves is corresponding, selecting the corresponding multiple-S-curve; and if no one of the plurality of multiple-S-curves is corresponding, generating a new multiple-S-curve corresponding to the selected S-curve and the sampling frequencies, and storing the new multiple-S-curve.

8. The audio data processing method as claimed in claim 7, wherein each S-curve is formed by a number of points arranged on frequencies movement of the obtained audio data.

9. The audio data processing method as claimed in claim 8, wherein number of the points of each S-curve is corresponding to utilization ratio of the processor.

10. The audio data processing method as claimed in claim 9, wherein the higher the utilization ratio of the processor is, the lower the number of the points of the corresponding S-curve is.

* * * * *